US008426056B2

(12) United States Patent
Ikeda et al.

(10) Patent No.: US 8,426,056 B2
(45) Date of Patent: Apr. 23, 2013

(54) POWER SUPPLY DEVICE (75) Inventors: Tomohiro Ikeda, Makinohara (JP); Takao Shoji, Makinohara (JP); Shinichi Yanagihara, Makinohara (JP); Yoshiaki Ichikawa, Makinohara (JP); Shigeyuki Ogasawara, Makinohara (JP); Kazuhisa Meguro, Toyota (JP); Yasuyoshi Fukao, Toyota (JP); Junta Katayama, Toyota (JP)

(73) Assignees: Yazaki Corporation, Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 356 days.

(21) Appl. No.: 12/672,814

(22) PCT Filed: Jul. 17, 2008

(86) PCT No.: PCT/JP2008/062955
§ 371 (c)(1),
(2), (4) Date: Apr. 14, 2010

(87) PCT Pub. No.: WO2009/022521
PCT Pub. Date: Feb. 19, 2009

(65) Prior Publication Data
US 2012/0009447 A1   Jan. 12, 2012

(30) Foreign Application Priority Data
Aug. 10, 2007  (JP) .............................. P. 2007-209076

(51) Int. Cl.
*H01M 2/20*   (2006.01)
*H01M 2/10*   (2006.01)
*H01M 10/48*  (2006.01)

(52) U.S. Cl.
USPC ............................ 429/158; 429/156; 429/159

(58) Field of Classification Search .................. 429/156, 429/158–160
See application file for complete search history.

(56) References Cited

U.S. PATENT DOCUMENTS

| | | | |
|---|---|---|---|
| 6,261,719 B1 | 7/2001 | Ikeda et al. | |
| 2004/0043663 A1 | 3/2004 | Ikeda et al. | |

(Continued)

FOREIGN PATENT DOCUMENTS

JP   7-22459 U   4/1995

(Continued)

OTHER PUBLICATIONS

International Search Report (PCT/ISA/210) for PCT/JP2008/062955 dated Oct. 21, 2008.

*Primary Examiner* — Gregg Cantelmo
(74) *Attorney, Agent, or Firm* — Sughrue Mion, PLLC (57) ABSTRACT A power supply device, which is simply assembled and in which a cell assembly and a measuring section are freely inserted and detached, is provided. A power supply device 1 includes a cell assembly 2, a plurality of first bus bars 51, a plate 3 to which the plurality of bus bars 51 are attached. The plate is overlapped on the cell assembly 2. The cell assembly 2 has a plurality of cells 21 respectively including positive electrodes 23 at one ends and negative electrodes 24 at the other ends. The first bus bars 51 connect the positive electrodes 23 of the one cells 21 to the negative electrodes 24 of the other cells 21 of the cell assembly 2 which are mutually adjacent when the plate 3 is overlapped or overlaid on the cell assembly 2. The power supply device 1 includes a positioning unit 71 that relatively positions the cell assembly 2 to the plate 3 and a guide unit 72 that guides the plurality of first bus bars 51 to positions where the first bus bars 51 connect the respectively corresponding positive electrodes 23 to the negative electrodes 24 when the plate 3 is attached to the cell assembly 2.

6 Claims, 8 Drawing Sheets

U.S. PATENT DOCUMENTS

| | | | |
|---|---|---|---|
| 2005/0031945 A1* | 2/2005 | Morita et al. | 429/158 |
| 2006/0145657 A1 | 7/2006 | Hashida et al. | |
| 2008/0118821 A1* | 5/2008 | Gehring et al. | 429/92 |
| 2010/0124693 A1* | 5/2010 | Kosugi et al. | 429/92 |

FOREIGN PATENT DOCUMENTS

| | | |
|---|---|---|
| JP | 2000-149909 A | 5/2000 |
| JP | 2004-95381 A | 3/2004 |
| JP | 2004-362996 A | 12/2004 |
| JP | 2004-362997 A | 12/2004 |
| JP | 2006-186045 A | 7/2006 |
| JP | 2006-210318 A | 8/2006 |

* cited by examiner

POWER SUPPLY DEVICE

TECHNICAL FIELD

The present invention relates to a power supply device mounted on a hybrid motor vehicle that travels by the driving forces of both an internal combustion engine and an electric motor or an electric motor vehicle that travels by the driving force of the electric motor.

BACKGROUND ART

On the hybrid motor vehicle driven by the driving forces of the internal combustion engine and the electric motor or the electric motor vehicle driven by the driving force of the electric motor, the power supply device is mounted and the power supply device serves to charge and discharge electric energy. Such a power supply device includes a cell assembly configured by a plurality of cells. In order to obtain a desired voltage, the plurality of cells are connected together in series. As the cell, a nickel hydrogen cell or a lithium ion cell is employed that is smaller and lighter, and higher in its supply voltage than the nickel hydrogen cell.

In the above-described power supply device, a positive electrode of one cell of the plurality of mutually adjacent cells is connected to a negative electrode of other cell by a connecting member to connect the plurality of cells in series. However, since a plurality of connecting members needs to be attached to the cell assembly, a problem arises that an assembly work is inconveniently complicated.

To solve the above-described problem, various power supply devices have been used (for instance, see patent literature 1). Such kind of power supply device includes a cell assembly having a plurality of cells, a plurality of connecting members that connect positive electrodes of one adjacent electrodes to negative electrodes of other cells of the cell assembly and a plate which is overlapped on the cell assembly and to which the plurality of connecting members are attached. On the outer peripheral surfaces of the positive electrodes and the negative electrodes, thread grooves are formed. In the plurality of connecting members and the plate, a plurality of holes are provided through which the positive electrodes and the negative electrodes are passed.

When the above-described power supply device is assembled, initially, the plurality of cells are overlapped and arranged in such a way that the positive electrodes and the negative electrodes of the mutually different cells are adjacent to each other. Subsequently, the plate to which the plurality of connecting members are attached is overlapped on the cell assembly, and the holes of the plate and the holes of the connecting members are respectively allowed to pass through the electrodes of the cells to attach the plate and the connecting members to the cell assembly. Then, nuts are screwed to the electrodes to fix the cell assembly to the plate and the connecting members.
[Patent literature 1] JP-A-2004-95381

DISCLOSURE OF THE INVENTION

Problems that the Invention is to Solve

However, in the above-described power supply device, the plurality of connecting members can be attached to the cell assembly at a time. Since the plate to which the plurality of connecting members are attached is overlapped on the cell assembly and the holes of the plate and the holes of the connecting members are respectively allowed to pass through the electrodes, and then, the nuts are screwed to the electrodes to fix the cell assembly to the plate and the connecting members, the problem that the assembly work is complicated is not sufficiently solved.

It is an object of the present invention to solve such a problem. That is, it is an object of the present invention to provide a power supply device in which a plate and connecting members can be simply and assuredly attached to prescribed positions of a cell assembly to simplify an assembly work.

Means for Solving the Problems

In order to solve the above-described problem and achieve the object, the present invention provides a power supply device comprising: a cell assembly which includes a plurality of cells, each of the cells having a positive electrode at one end and a negative electrode at the other end; a plurality of connecting members, each of which connects the positive electrode of one cell and the negative electrode of the other cell in the cell assembly, the one cell and the other cell being mutually adjacent; a plate to which the plurality of connecting members are attached and which is overlapped on the cell assembly; a positioning unit that relatively positions the cell assembly to the plate; and a guide unit that guides the plurality of connecting members to positions where the connecting members respectively come into contact with the corresponding positive electrodes and negative electrodes when the plate is attached to the cell assembly.

Preferably, in the power supply device, the positioning unit includes a plurality of protruding portions protruding from one face of the cell assembly and a plurality of holes provided into the plate into which the plurality of protruding portions are inserted.

Preferably, in the power supply device, each of the connecting member includes a pair of contact pieces that position the positive electrode and the negative electrode therebetween, and a connecting piece that connects one end parts of the pair of contact pieces to each other. The guide unit is the pair of contact pieces having a space therebetween which is provided so as to be gradually larger than a space between the positive electrode and the negative electrode as the guide unit comes nearer to the positive electrode and the negative electrode.

Preferably, in the power supply device, the plate includes a main body part arranged at a center of the cell assembly, a pair of outer side parts provided in parallel with the main body part, the main body part being arranged between them, and a connecting part provided so as to be elastically deformed and connects the main body part to the pair of outer side parts.

Preferably, the power supply device further comprises elastically deformed portions provided on an outer face of the cell assembly, abut on the connecting members and are elastically deformed to urge the connecting members to be separated from the cell assembly when the plate is overlapped on the cell assembly.

Preferably, the power supply device further comprises a measuring section which includes an electric wire arranged on the plate and a terminal attached to a terminal part of the electric wire to measure a potential difference of the electrodes of the two adjacent cells of the cell assembly. The connecting member has a connecting piece provided so as to be detachably attached to the terminal and electrically connected to the terminal when the connecting piece comes into contact with the terminal.

Preferably, in the power supply device, a cell temperature detector is attached to the plate. The cell temperature detector includes a detector main body, and an elastic arm having one end part connected to the detector main body and the other end part engaged with the plate. When the plate is attached to the cell assembly, the elastic arm generates an elastic restoring force so that the elastic arm press the detector main body toward an outer face of the cell assembly.

According to the above-described structure, since the power supply device includes the positioning unit that relatively positions the cell assembly to the plate and the guide unit that guides the plurality of connecting members to positions where the connecting members respectively come into contact with the corresponding positive electrodes and negative electrodes when the plate is attached to the cell assembly, the cell assembly and the plate are positioned by the positioning unit to overlap or overlay the plate on the cell assembly. The plurality of connecting members are guided to the positions where the connecting members respectively come into contact with the corresponding positive electrodes and the negative electrodes by the guide unit.

According to the above-described structure, since the positioning unit includes the plurality of protruding portions protruding from the one face of the cell assembly and the plurality of holes provided in the plate into which the plurality of protruding portions are inserted, when the plurality of protruding portions are respectively inserted into the plurality of corresponding holes, the cell assembly and the plate are positioned.

According to the above-described structure, the connecting member includes the pair of contact pieces that positions the positive electrode and the negative electrode therebetween and the connecting piece that connects one end parts of the pair of contact pieces to each other and the guide unit is the pair of contact pieces having the space therebetween which is provided so as to be gradually larger than the space between the positive electrode and the negative electrode as the guide unit comes nearer to the positive electrode and the negative electrode. Thus, when the connecting member is allowed to come nearer to the corresponding positive electrode and negative electrode, the positive electrode and the negative electrode are assuredly located between the one pair of contact parts.

According to the above-described structure, the plate includes the main body part arranged at the center of the cell assembly, a pair of outer side parts provided in parallel with the main body part and, the main body part being arranged between the pair of outer side parts, and the connecting part that is provided so as to be elastically deformed and connects the main body part to the pair of outer side parts. Thus, since the main body part and the pair of outer side parts are respectively displaced relative to the cell assembly, the plurality of connecting members assuredly come into contact with the respectively corresponding positive electrodes and the negative electrodes.

According to the above-described structure, the elastically deformed portions are provided on the outer face of the cell assembly, abut on the connecting members and are elastically deformed to urge the connecting members to be separated from the cell assembly when the plate is overlapped on the cell assembly. Thus, when the connecting members are attached to the corresponding positive electrodes and negative electrodes, even if the connecting members are inclined, the elastically deformed portions push back the connecting members to hold the connecting members in their horizontal positions.

According to the above-described structure, the power supply device further includes the measuring section having the electric wire arranged on the plate and the terminal attached to the terminal part of the electric wire to measure the potential difference of the electrodes of the two adjacent cells of the cell assembly. The connecting member has the connecting piece provided so as to be detachably attached to the terminal and electrically connected to the terminal when the connecting piece comes into contact with the terminal. Thus, after the plate is attached to the cell assembly, the terminal of the measuring section is allowed to come into contact with the connecting piece of the connecting member, so that the terminal can be electrically connected to the connecting member.

According to the above-described structure, the cell temperature detector is attached to the plate. The cell temperature detector includes the detector main body and the elastic arm having one end part connected to the detector main body and the other end part engaged with the plate. When the plate is attached to the cell assembly, the elastic arm generates the elastic restoring force so that the elastic arm presses the detector main body toward the outer surface of the cell assembly. Thus, when the plate is overlapped on the cell assembly, the cell temperature detector assuredly comes into contact with the outer surface of the cell assembly.

Advantages of the Invention

As described above, since the present invention includes the positioning unit and the guide unit, the cell assembly and the plate are positioned by the positioning unit and the plurality of connecting members are guided to the positions where the connecting members respectively come into contact with the corresponding positive electrodes and negative electrodes by the guide unit. Accordingly, the plate can be simply attached to the prescribed position of the cell assembly. Further, the plurality of connecting members can be assuredly attached to the positive electrodes and the negative electrodes by an operation at one time and an assembly work can be simplified.

Further, since a plurality of bosses and the plurality of holes into which the plurality of bosses are inserted are provided, when the plurality of bosses are respectively inserted into the plurality of corresponding holes, the cell assembly and the plate are positioned. Accordingly, the plate can be simply attached to the prescribed position of the cell assembly and the assembly work can be simplified.

Further, since the guide unit is the pair of contact pieces having the space therebetween which is provided so as to be gradually larger than the space between the positive electrode and the negative electrode as the guide unit comes nearer to the positive electrode and the negative electrode, the positive electrode and the negative electrode can be assuredly located between the pair of contact pieces. Accordingly, the plurality of connecting members can be assuredly attached to the positive electrodes and the negative electrodes by the operation at one time and the assembly work can be simplified.

Further, since the plate includes the main body part, the pair of outer side parts and the connecting part that connects the main body part to the one pair of outer side parts, the main body part and the pair of outer side parts are respectively displaced relative to the cell assembly and the plurality of connecting members assuredly come into contact with the respectively corresponding positive electrodes and the negative electrodes. Accordingly, the plurality of connecting members can be assuredly attached to the positive electrodes and the negative electrodes.

Further, the elastically deformed portions are provided on the outer face of the cell assembly, abut on the connecting members and are elastically deformed to urge the connecting members to be separated from the cell assembly. Thus, when the connecting members are attached to the corresponding positive electrodes and negative electrodes, even if the connecting members are inclined, the elastically deformed portions push back the connecting members to hold the connecting members in their horizontal positions. Accordingly, the connecting members are not attached to the positive electrodes and the negative electrodes under a state that the connecting members are inclined and the connecting members can be allowed to assuredly come into contact with the positive electrodes and the negative electrodes.

Further, the power supply device further includes the measuring section having the electric wire arranged on the plate and the terminal attached to the terminal part of the electric wire. The connecting member has the connecting piece provided so as to be detachably attached to the terminal and electrically connected to the terminal. Thus, after the plate is attached to the cell assembly, the terminal can be allowed to come into contact with the connecting member. Before the cell assembly is attached to the plate, the terminal does not need to come into contact with the connecting member. Accordingly, even when the connecting member is moved for positioning at the time of attaching the plate to the cell assembly, a stress is not exerted on a connecting part of the terminal and the connecting part. Thus, the damage of the terminal or the connecting member can be prevented.

Further, the cell temperature detector is attached to the plate. When the plate is attached to the cell assembly, the elastic arm of the cell temperature detector generates the elastic restoring force so that the elastic arm presses the detector main body toward the outer face of the cell assembly. Thus, when the plate is overlapped on the cell assembly, the cell temperature detector assuredly comes into contact with the outer face of the cell assembly. Accordingly, the cell temperature detector can be simply and assuredly attached to the cell assembly.

DESCRIPTION OF REFERENCE NUMERALS AND SIGNS

1 . . . power supply device
2 . . . cell assembly
3 . . . plate
5 . . . connecting member
6 . . . measuring section
8 . . . cell temperature detector
21 . . . cell
23 . . . positive electrode
24 . . . negative electrode
26 . . . first boss (protruding portion)
27 . . . second boss (protruding portion)
28 . . . elastically deformed portion
31 . . . main body part
34 . . . first hole (hole)
36 . . . connecting part
41 . . . outer side part
45 . . . second hole (hole)
51 . . . first bus bar (connecting member)
52 . . . contact piece (guide unit)
53 . . . connecting piece
54 . . . connecting piece
61 . . . electric wire
71 . . . positioning unit
72 . . . guide unit
81 . . . detector main body
82 . . . elastic arm

BEST MODE FOR CARRYING OUT THE INVENTION

Now, a power supply device 1 according to a first embodiment of the present invention will be described below by referring to FIGS. 1 to 9. The power supply device 1 according to the first embodiment of the present invention is mounted on a hybrid vehicle that is driven by the driving forces of both an internal combustion engine and an electric motor or an electric motor vehicle that is driven by the driving force of the electric motor.

Figure 1:
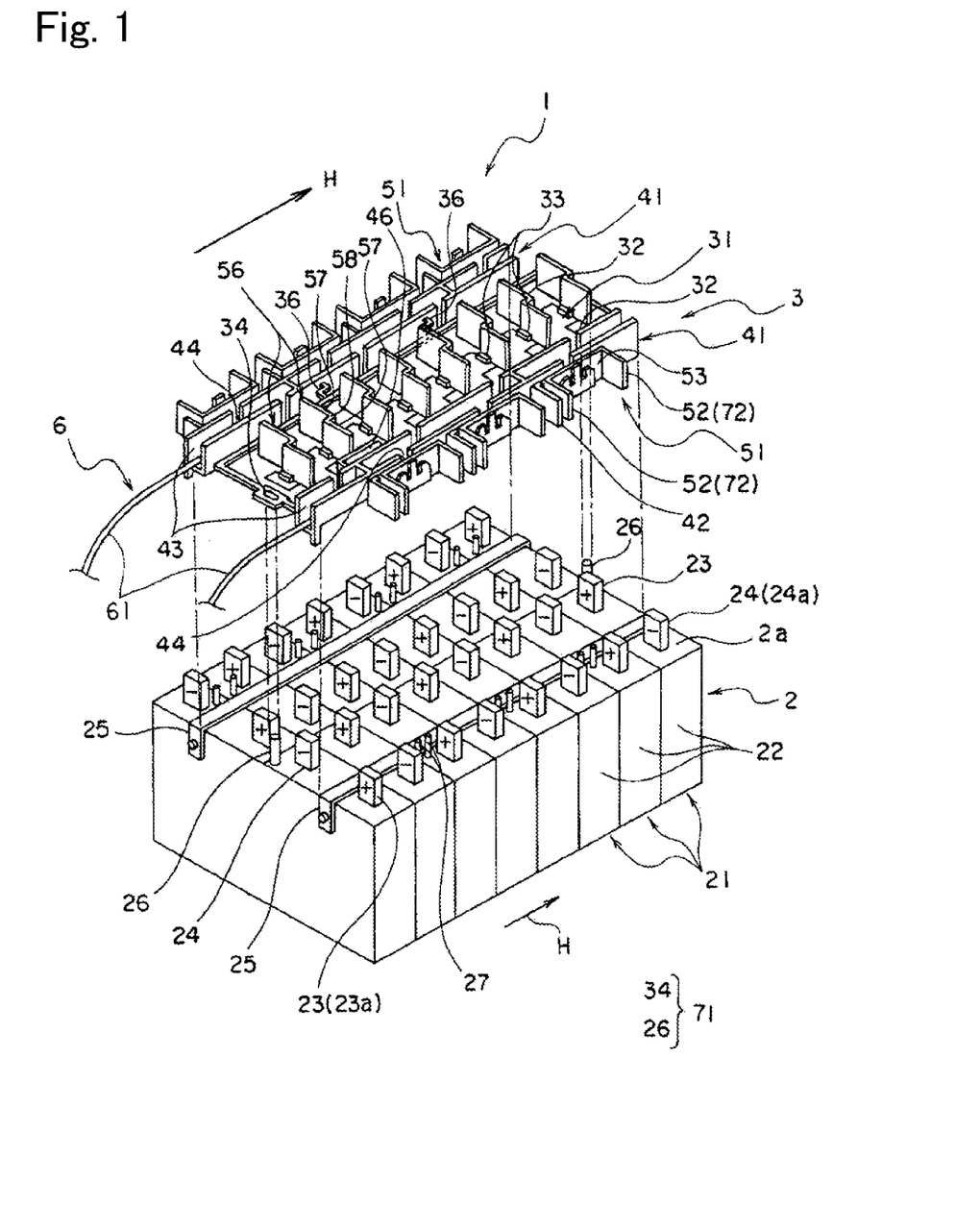
[FIG. 1] is a perspective view showing, in an exploded state, a power supply device according to a first embodiment of the present invention.

As shown in FIG. 1, the power supply device 1 includes a cell assembly 2, a plurality of first bus bars 51 (corresponding to connecting members), a plurality of second bus bars 56 and a plate 3. The cell assembly 2 has a plurality of cells 21 provided with positive electrodes (refer them as to anodes, hereinafter) 23 at one ends and negative electrodes (refer them to as cathodes, hereinafter) 24 at the other ends. The plurality of first bus bars 51 and the plurality of second bus bars 56 connect the anodes 23 of the one cells 21 to the cathodes 24 of the other cells 21 of the cell assembly 2 which are adjacent to each other. The first bus bars 51 and the second bus bars 56 are attached to the plate 3. The plate 3 is overlapped or overlaid on the cell assembly 2.

As shown in FIG. 1, the cell assembly 2 includes the plurality of cells 21. The cell 21 includes a square pole shaped cell main body 22, the anode 23 provided at the one end of the cell main body 22 and the cathode 24 provided at the other end of the cell main body 22. The anode 23 and the cathode 24 are formed in rectangular pole shapes, protrude in the same direction from one end face of the cell main body 22 and provided in parallel with each other.

The plurality of cells 21 are arranged in two rows along one direction H in such a state that the anodes 23 and the cathodes 24 of the mutually adjacent cells 21 are mutually adjacent under a state that one end faces are located on the same plane. The plurality of cells 21 are stacked in such a state that the anodes 23 and the cathodes 24 are alternately directed to opposite sides.

Further, the cell assembly 2 includes a band 25 for bundling and fixing the plurality of cells 21, a plurality of first bosses 26 (corresponding to protruding portions) and a plurality of second bosses (corresponding to protruding portions) 27 protruding from one end face (refer it to as an upper surface, hereinafter) 2a of the cell assembly 2.

The band 25 is made of an insulating synthetic resin and formed in the shape of a band plate. A plurality of bands 25 (two in an illustrated example) are provided in parallel with each other with a space provided between them. The bands 25 are arranged along the one direction H in which the plurality of cells 21 are arranged and extend from the upper surface 2a of the cell assembly 2 to side surfaces connected to the upper surface 2a. The bands 25 are fixed to the above-described side surfaces by bolts to unite and hold the cells 21 respectively.

The first bosses 26 are configured in cylindrical forms. The first bosses 26 are formed so as to extend vertically from the upper surface 2a of the cell assembly 2. One pair of first bosses 26 is provided in the cells 21 located at both ends of the plurality of cells 21 arranged in the one direction H. The one pair of bosses 26 are provided in parallel with each other. The first bosses 26 are allowed to pass through below-described first holes 34.

The second bosses 27 are configured in cylindrical forms. The second bosses 27 are provided so as to extend vertically from the upper surface 2a of the cell assembly 2. The plurality of second bosses 27 is provided which are mutually in parallel. The second bosses 27 are provided near the anodes 23 and the cathodes 24 of the cells 21 to which the below-described first bus bars 51 are attached. The second bosses 27 are formed to be shorter than the first bosses 26 and provided in parallel with the first bosses 26.

The plate 3 is made of an insulating synthetic resin and is generally formed in a substantially flat plate shape. The plate 3 is overlapped or overlaid on the upper surface 2a of the cell assembly 2 and formed to be smaller than the upper surface 2a. As shown in FIG. 1, the plate 3 integrally includes a main body part 31 arranged at a center of the upper surface 2a in the direction of width (a direction orthogonal to the one direction H in which the plurality of cells 21 are arranged), one pair of outer side parts 41 provided in parallel with the main body part 31 and having the main body part 31 arranged between them and connecting parts 36 that are provided so as to be freely elastically deformed and connect the main body part 31 to the one pair of outer side parts 41.

The main body part 31 is configured in a rectangular flat plate form in its plane form and is provided with electrode through holes 32 through which the anodes 23 and the cathodes 24 of the above-described cells 21 are respectively allowed to pass through. The main body part 31 is overlapped or overlaid on the upper surface 2a of the cell assembly 2 by allowing the anodes 23 and the cathodes 24 to pass through the electrode through holes 32. The main body part 31 includes bus bar accommodating parts 33 and first holes 34 (corresponding to holes).

The plurality of bus bar accommodating parts 33 are provided on an outer surface of the main body part 31 separated from the upper surface 2a of the cell assembly 2. The bus bar accommodating parts 33 are formed with a plurality of partition walls standing upright from the outer surface. The plurality of bus bar accommodating parts 33 are arranged along the longitudinal direction of the main body part 31. In the bus bar accommodating parts 33, the second bus bars 56 are accommodated. In the bus bar accommodating parts 33, the second bus bars 56 are accommodated and the second bus bars 56 are attached to the plate 3.

One pair of first holes 34 pass through the main body part 31. The first holes 34 are provided at both end parts in the longitudinal direction of the main body part 31. The inside diameter of the first hole 34 is formed to be a little larger than the outside diameter of the first boss 26. Into the first hole 34, the above-described first boss 26 of the cell assembly 2 is inserted. The first hole 34 and the first boss 26 form a positioning unit 71 for relatively positioning the cell assembly 2 and the plate 3.

The one pair of outer side parts 41 include bottom walls and a plurality of partition walls standing upright from the bottom palls and are provided in parallel with the above-described main body part 31. When the plate 3 is overlapped or overlaid on the cell assembly 2, the one pair of outer side parts 41 are arranged on both end parts in the direction of width of the cell assembly 2. The outer side parts 41 include bus bar accommodating parts 42, electric wire accommodating grooves 43, connector accommodating parts 44, second holes 45 (corresponding holes) and a cell temperature detector accommodating part 46.

The plurality of bus bar accommodating parts 42 are provided and configured in U shapes by the above-described plurality of partition walls. The plurality of bus bar accommodating parts 42 are arranged along the longitudinal direction of the outer side part 42. In the bus bar accommodating parts 42, the first bus bars 51 are accommodated and the first bus bars 51 are attached to the plate 3.

The electric wire accommodating grooves 43 are configured in groove shapes by the above-described partition walls. The electric wire accommodating grooves 43 are provided along the longitudinal direction of the outer side parts 41. In the electric wire accommodating grooves 43, below-described electric wires 61 of a measuring section 6 are accommodated.

The connector accommodating parts 44 are formed by cutting out end parts of the above-described partition walls in the vertical direction. The connector accommodating parts 44 are provided near the bus bar accommodating parts 42 and formed by cutting out the partition walls facing connecting pieces 54 of the first bus bars 51 accommodated in the bus bar accommodating part 42. In the connector accommodating parts 44, connectors 66 having below-described terminals of the measuring section 6 are arranged.

Figure 3:
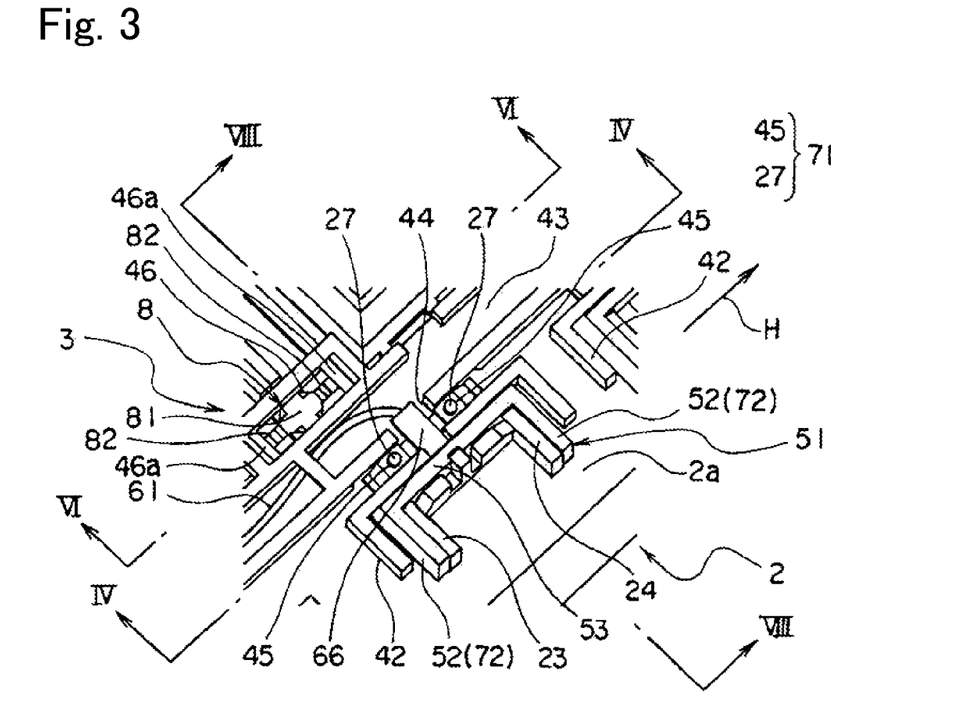
[FIG. 3] is a perspective view showing by enlarging a part of the power supply device shown in FIG. 1 which is assembled.

The plurality of second holes 45 are provided to pass through the bottom walls. As shown in FIG. 3, the second holes 45 are provided in the vicinity of the bus bar accommodating parts 42. The inside diameter of the second hole 45 is formed to be slightly larger than the outside diameter of the second boss 27. Into the second holes 45, the above-described bosses 27 of the cell assembly 2 are inserted. The second holes 45 and the second bosses 27 form the positioning unit 71 for relatively positioning the cell assembly 2 to the plate 3 together with the first holes 34 and the first bosses 26.

The cell temperature detector accommodating part 46 is formed in a cylindrical shape by the above-described walls to accommodate a below-described cell temperature detector 8 therein. In the cell temperature detector accommodating part 46, a lock protrusion 46a is provided so as to protrude from an inner surface. The lock protrusion 46a is engaged with the ends of elastic arms 82 of the cell temperature detector 8.

As shown in FIG. 1, the plurality of connecting parts 36 are provided between the main body part 31 and the outer side parts 41 respectively and provided at prescribed intervals along the longitudinal direction of the main body part 31 (and the outer side parts 41). The connecting parts 36 have one ends connected to the main body part 31 and the other ends connected to the outer side parts 41 to connect the main body part 31 to the one pair of outer side parts 41. The connecting parts 36 are configured in crank shapes of small width and freely elastically deformed. The connecting parts 36 are elastically deformed to separately displace the main body part 31 and the one pair of outer side parts 41 relative to the cell assembly 2.

Figure 6:
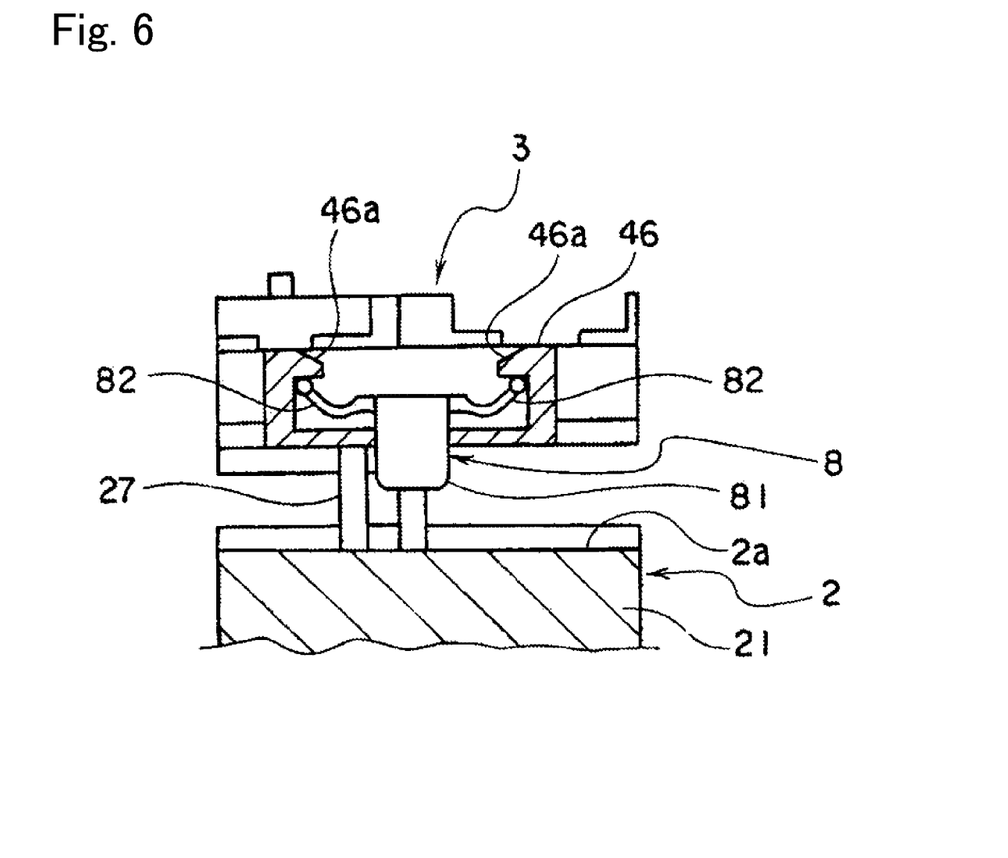
[FIG. 6] is a partly sectional view taken along a line VI-VI showing a state before a cell temperature detector comes into contact with a surface of the cell assembly in a process that the cell assembly shown in FIG. 1 is assembled.

On the plate 3 having the above-described structure, as shown in FIG. 6, the cell temperature detector 8 is attached. The cell temperature detector 8 constantly comes into contact with the upper surface 2a of the cell assembly 2 to detect the temperature of the upper surface 2a when the plate 3 is attached to the cell assembly 2. The cell temperature detector 8 is connected to a power controller by an electric wire that is not shown and information detected by the cell temperature detector 8 is transmitted to the power controller by the electric wire. The cell temperature detector 8 includes a detector main body 81 and one pair of elastic arms 82 having one end parts connected to the detector main body 81 and the other end parts engaged with the lock protrusion 46a of the cell temperature detector accommodating part 46 of the plate 32.

Figure 7:
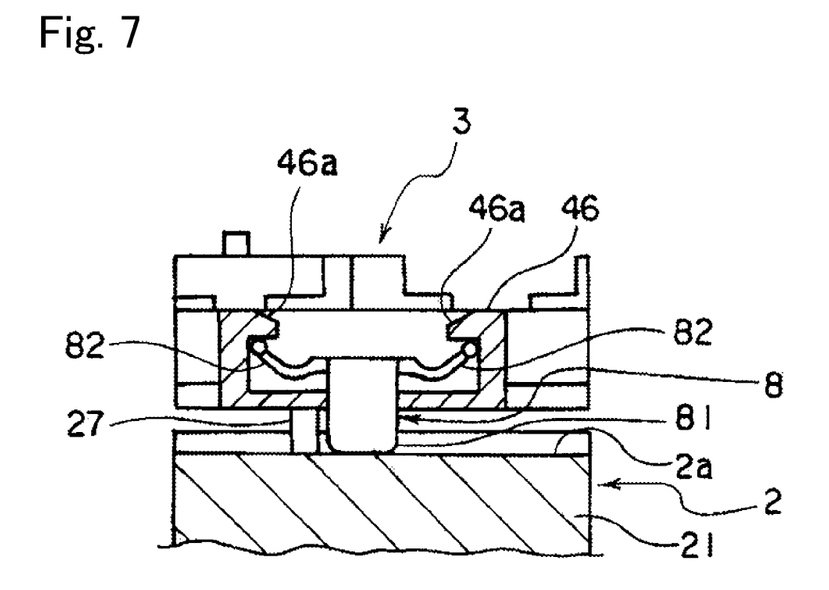
[FIG. 7] is a sectional view showing a state that the cell temperature detector shown in FIG. 6 comes into contact with the surface of the cell assembly.

As shown in FIG. 6, the elastic arms 82 are elastically deformed to pass the cell temperature detector accommodating part 46, and then, the elastic arms 82 are elastically restored in the cell temperature detector accommodating part 46 and abut on an inner surface of the cell temperature detector accommodating part 46. Thus, the cell temperature detector 8 is held in the cell temperature detector accommodating part 46. When the plate 3 is allowed to come nearer to the cell assembly 2, the end of the detector main body 81 comes into contact with the upper surface 2a of the cell assembly 2. Then, when the plate 3 is further allowed to come nearer to the cell assembly 2 to attach the plate 3 to the cell assembly 2, as shown in FIG. 7, the elastic arms 82 are pressed by the lock protrusion 46a of the cell temperature detector accommodating part 46 to be elastically deformed and generate an elastic restoring force so as to press the detector main body 81 toward the upper surface 2a of the cell assembly 2. Thus, the detector main body 81 is constantly allowed to come into contact with the upper surface 2a.

The first bus bars 51 and the second bus bars 56 are formed with an electrically conductive metal material. The first bus bars 51 and the second bus bars 56 connect the mutually adjacent anodes 23 and cathodes 24 of the mutually adjacent cells 21 to connect the cells 21 in series.

The plurality of first bus bars 51 are provided. The first bus bar 51 has a substantially U shape as a whole. As shown in FIG. 3, the first bus bar 51 includes a pair of contact pieces 52 that position the anode 23 and the cathode 24 between them, a connecting piece 53 for connecting one end parts of the pair of contact pieces 52 to each other and a connecting piece 54 (FIG. 8) protruding from the connecting piece 53.

The pair of contact pieces 52 are formed in rectangular shapes in their plane forms and provided with spaces between them. The space between the pair of contact pieces 52 is provided so as to be gradually larger than a space between the anode 23 and the cathode 24 as the contact pieces 52 come nearer to the anode 23 and the cathode 24 (in FIG. 5, directed downward). Further, the space between the pair of contact pieces 52 at a side separated from the anode 23 and the cathode 24 is provided so as to be substantially the same as the space between the anode 23 and the cathode 24. Namely, when the first bus bar 51 is attached to the corresponding anode 23 and cathode 24, inner surfaces of the pair of contact pieces 52 at the side separated from the anode 23 and the cathode 24 come into contact with the anode 23 and the cathode 24. The pair of contact pieces 52 are served as a guide unit 72 that guides the plurality of first bus bars 51 to positions where the respectively corresponding anodes 23 and cathodes 24 are connected together when the plate 3 is attached to the cell assembly 2.

The connecting piece 53 is formed in a rectangular shape in its plane form. In the center of an outer surface (an outer surface of a side separated from the contact pieces 52) of the connecting piece 53, the connecting piece 54 protrudes. The connecting piece 54 is configured in the shape of a tab and provided to extend from the outer surface in an opposite direction to the pair of contact pieces 52. The connecting piece 54 is provided so as to be detachably attached to the terminal of the below-described measuring section 6. When the connecting piece 54 comes into contact with the terminal, the connecting piece is electrically connected to the terminal.

The plurality of first bus bars 51 having the above-described structures are respectively accommodated in the bus bar accommodating parts 42 of the plate 3 so that the connecting pieces 53 are respectively arranged inside the plate 3 and attached to the outer side parts 41. Then, when the plate 3 is overlapped or overlaid on the cell assembly 2, the first bus bars 51 are respectively arranged near the corresponding anodes 23 and cathodes 24 and smoothly guided to the positions where the anodes 23 are connected to the cathodes 24 by the one pairs of contact pieces 52 having the spaces between them wider gradually as the contact pieces come nearer to the anodes 23 and the cathodes 24 as described above. Thus, the anodes 23 and the cathodes 24 are arranged between the one pairs of contact pieces 52 to connect together the mutually adjacent anodes 23 and cathodes 24 of the mutually adjacent cells 21.

The plurality of second bus bars 56 is provided. As shown in FIG. 1, the second bus bar 56 has a substantially crank shape. The second bus bar 56 includes a pair of contact pieces 57 which come into contact with the anode 23 and the cathode 24 and a connecting piece 58 which connects one end parts of the pair of contact pieces 57 to each other. The plurality of second bus bars 56 are arranged obliquely to the longitudinal direction of the main body part 31, accommodated in the bus bar accommodating parts 33 of the plate 3 and attached to the main body part 31.

The second bus bars 56 having the above-described structures are arranged, when the plate 3 is overlapped or overlaid on the cell assembly 2, so that the second bus bars 56 are respectively provided between the corresponding anodes 23 and cathodes 24 so as to intersect the direction in which the anodes 23 and the cathodes 24 are arranged and not to come into contact with the anodes 23 and the cathodes 24. Then, the second bus bars 56 are rotated on the connecting pieces 58 by a jig or the like so that the one pairs of contact pieces 57 are respectively allowed to come into contact with the anodes 23 and the cathodes 24 to connect together the mutually adjacent anodes 23 and cathodes 24 of the mutually adjacent cells 21.

The first bus bars 51 and the second bus bars 56 having the above-described structures connect together the mutually adjacent anodes 23 and cathodes 24 of the mutually adjacent cells 21, so that the plurality of cells 21 are connected in series. Then, a current is taken out from an anode 23a and a cathode 24a shown in FIG. 1.

The power supply device 1 having the above-described structure further includes the measuring section 6 that measures a potential difference of the anode 23 and the cathode 24 of the two adjacent cells 21. As shown in FIG. 3, the measuring section 6 includes an electric wire 61 arranged on the plate 3 and a connector 66 having a terminal (not shown in the drawing) attached to a terminal part of the electric wire 61.

The electric wire 61 is a covered electric wire having a core wire and a covering part that covers an outer surface of the core wire. The electric wire 61 is accommodated in the above-described electric wire accommodating groove 43 of the plate 3 and arranged on the plate 3. One end of the electric wire 61 is electrically connected to a below-described electric wire connecting part of the terminal and the other end is connected to the power controller (not shown in the drawing) for measuring the potential of the cell 21.

Figure 8:
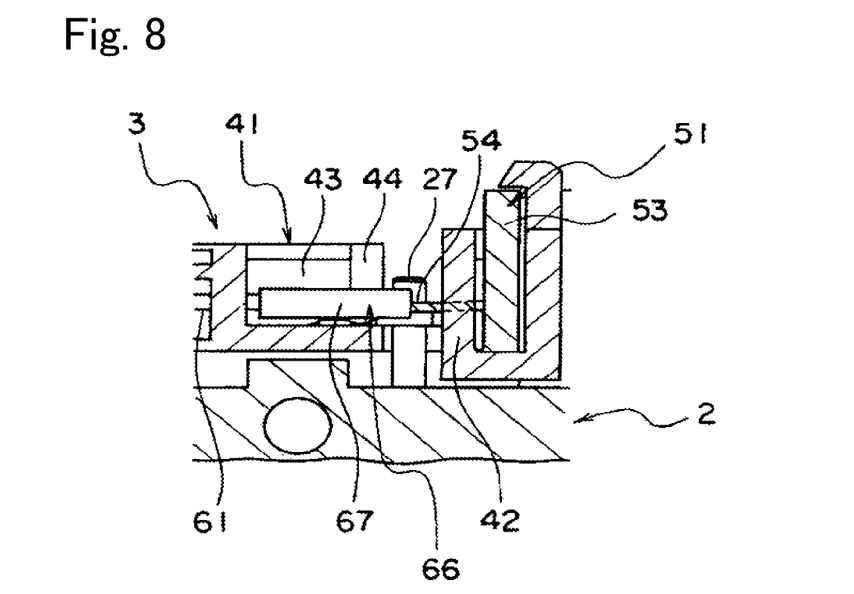
[FIG. 8] is a partly sectional view take along a line VIII-Viii showing a state before a terminal of a connector shown in FIG. 3 is connected to a connecting part of a first bus bar.
Figure 9:
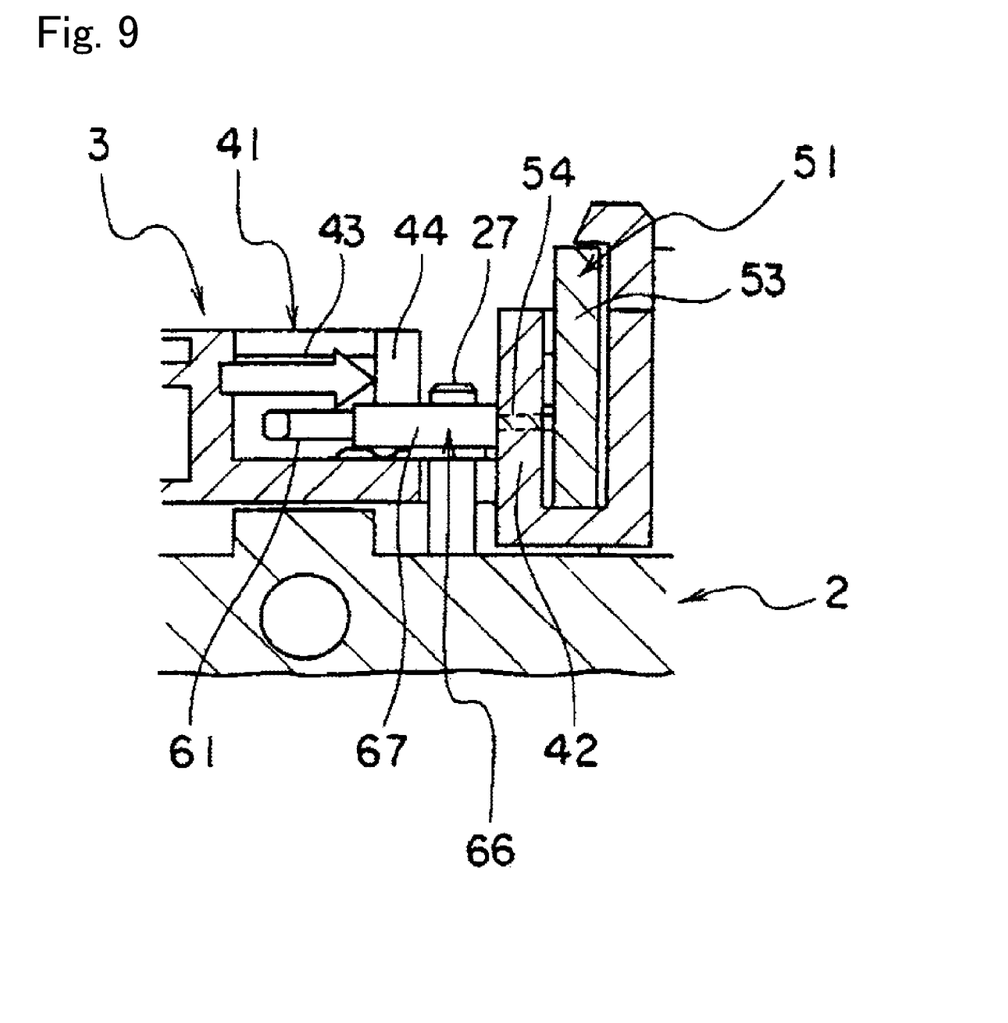
[FIG. 9] is a partly sectional view showing a state that the terminal of the connector shown in FIG. 8 is connected to the connecting part of the first bus bar.

One pair of connectors 66 is provided. The connectors 66 are accommodated in the above-described connector accommodating parts 44 of the plate 3. The connectors 66 are arranged along the direction of width of the plate 3 and accommodated in the connector accommodating parts 44 so as to be movable along the direction of the width (FIG. 8 and FIG. 9). The connector 66 includes a connector housing 67 and the terminal electrically connected to the connecting piece 54 of the first bus bar 51.

The connector housing 67 is made of an insulating synthetic resin and formed in a cylindrical shape. The connector housing 67 includes a terminal accommodating part for accommodating the terminal therein. The terminal accommodating part is arranged along the direction of width of the plate 3.

The terminal is made of an electrically conductive material and formed by bending a plate or the like. The terminal is a female terminal and includes integrally an electric contact part and an electric wire connecting part. The electric contact part is arranged in a side of the terminal accommodating part facing the first bus bar 51, and when the connecting piece 54 of the first bus bar 51 is inserted therein, an elastic piece presses the connecting piece 54 to an inner surface of the electric contact part to electrically connect the terminal to the first bus bar 51. The electric wire connecting part is arranged in a side of the terminal accommodating chamber separated from the first bus bar 51 and connected to the core wire of the electric wire 61 to connect the connector 66 to the electric wire 61.

The measuring section 6 of the above-described structure allows the terminals of the pair of connectors 66 respectively to come into contact with the connecting pieces 54 of the different first bus bars 51 to measure the potential difference between the first bus bars, that is, the potential difference between the anode 23 and the cathode 24 of the cells 21.

Figure 2:
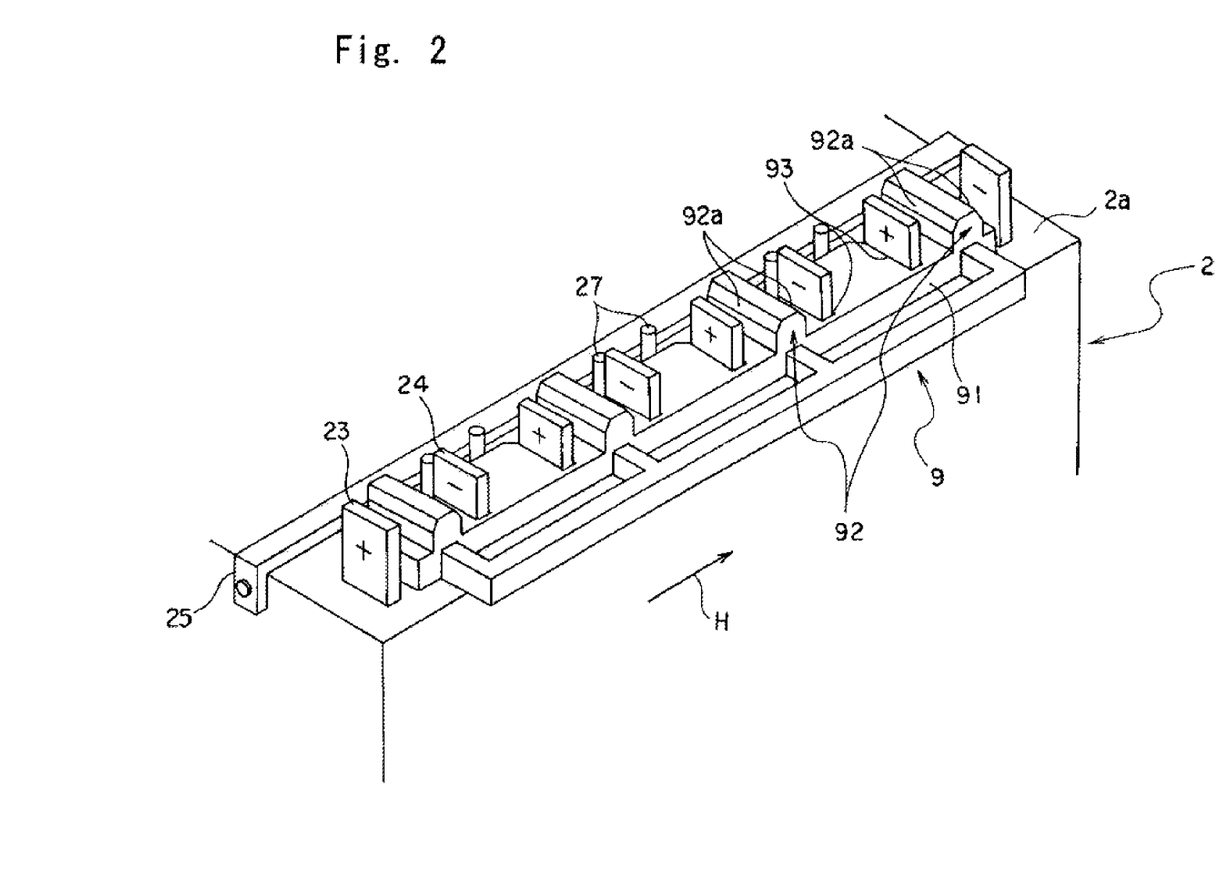
[FIG. 2] is a perspective view showing a state that an attaching jig is attached to a cell assembly shown in FIG. 1.

When the power supply device 1 of the above-described structure is assembled, an attaching jig 9 is used. As shown in FIG. 2, the attaching jig 9 is attached to an end part in a direction orthogonal to the one direction H of the cell assembly 2 along the one direction H in which the plurality of cells 21 of the cell assembly 2 are arranged, namely, near the anodes 23 and the cathodes 24 to which the first bus bars 51 are attached. The attaching jig 9 includes a jig main body 91, guide ribs 92 for guiding the bus bar accommodating parts 42 in which the first bus bars 51 of the plate 3 are accommodated to positions near the corresponding anodes 23 and cathodes 24 and electrode accommodating grooves 93 through which the anodes 23 and the cathodes 24 are allowed to pass.

The jig main body 91 is formed in the shape of a rectangular flat plate in its plane form. The thickness of the jig main body 91 is provided to be smaller than an amount of protrusion of the second bosses 27 from the upper surface 2a of the cell assembly 2. When the attaching jig 9 is attached to the cell assembly 2, the second bosses 27 protrude from an outer surface of the jig main body 91 separated from the upper surface 2a of the cell assembly 2.

The plurality of guide ribs 92 protrude from the outer surface of the jig main body 91. The guide ribs 92 are provided to extend along the direction of width of the jig main body 91. As the plurality of guide ribs 92, four guide ribs are provided in an illustrated example and arranged with spaces formed between them along the longitudinal direction of the jig main body 91. The space between the guide ribs 92 is formed to be slightly larger than the width of the U shaped bus bar accommodating part 42 of the plate 3. When the plate 3 comes near to the attaching jig 9, the bus bar accommodating parts 42 are arranged between the mutually adjacent guide ribs 92. In an end part of the guide rib 92, tapered surfaces 92a are provided. The tapered surfaces 92a are provided so as to reduce the thickness of the guide rib 92 as the tapered surfaces come nearer to the end of the guide rib 92.

The plurality of electrode accommodating grooves 93 are provided which are formed in cut-out shapes along the direction of width of the jig main body 91 from one ends of the direction of width thereof. The plurality of electrode accommodating grooves 93 are provided in parallel with spaces formed between them along the longitudinal direction of the jig main body 91. In the illustrated example, six electrode accommodating grooves are provided. One pair of electrode accommodating grooves 93 are provided between the mutually adjacent guide ribs 92. When the attaching jig 9 is attached to the cell assembly 2, to the electrode accommodating grooves 93, the anodes 23 and the cathodes 24 to which the first bus bars 51 are attached are accommodated.

When the power supply device 1 of the above-described structure is assembled, initially, the attaching jig 9 is attached to the cell assembly 2 as described above. Then, the plate 3 to which the first bus bars 51, the second bus bars 56, the measuring section 6 and the cell temperature detector 8 are attached is allowed to face the upper surface 2a of the cell assembly 2, and the plate 3 is allowed to come nearer to the cell assembly 2. At this time, the first bosses 26 of the cell assembly 2 are inserted into the first holes 34 of the plate 3 to position the plate 3 to the cell assembly 2. The first bosses 26 are inserted into the first holes 34 so that the plate 3 is positioned to the cell assembly 2 and arranged in a desired position on the upper surface 2a.

Figure 4:
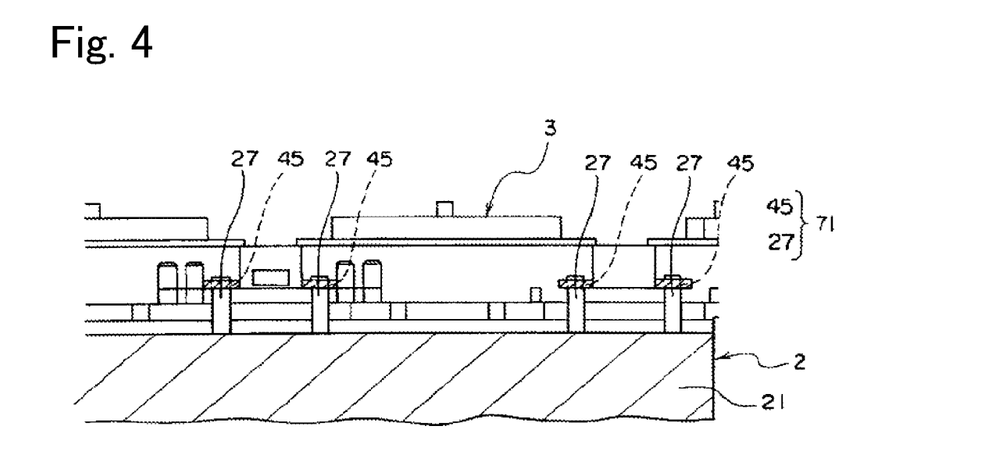
[FIG. 4] is a partly sectional view taken along a line IV-IV showing a state that second bosses are inserted into guide holes in a process that the power supply device shown in FIG. 3 is assembled.

Subsequently, as shown in FIG. 4, the plate 3 is positioned to the cell assembly 2 so that the second bosses 27 of the cell assembly 2 are inserted into the second holes 45 of the plate 3. The second bosses 27 are inserted into the second holes 45, so that the plate 3 is more accurately positioned to the cell assembly 2 (in FIG. 4, the attaching jig 9 is omitted).

Figure 5:
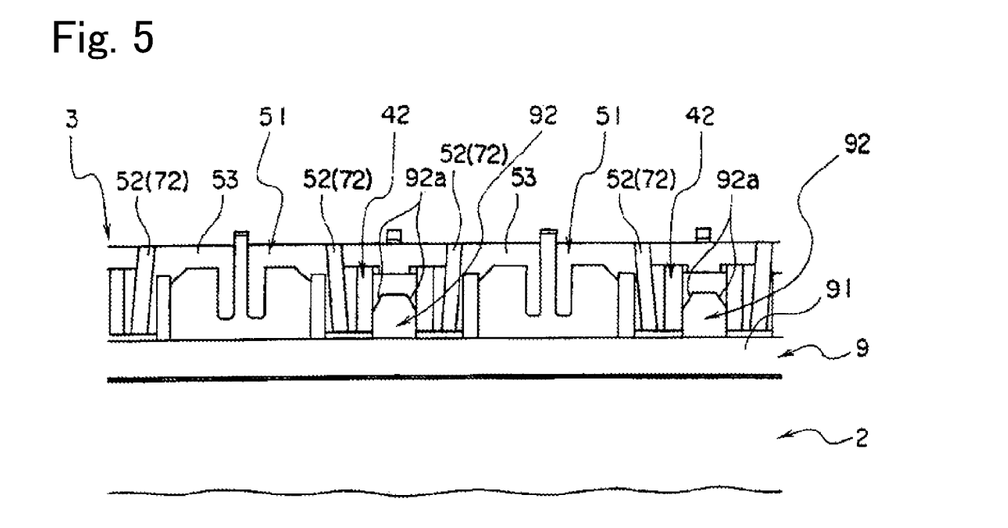
[FIG. 5] is a side view showing a state that a plate is overlapped on the attaching jig in a process that the power supply device shown in FIG. 2 is assembled.

Then, the plate is overlaid on the attaching jig 9. Thus, as shown in FIG. 5, the bus bar accommodating parts 42 in which the first bus bars 51 are accommodated are assuredly guided between the guide ribs 92 by the tapered surfaces 92a provided on the guide ribs 92 of the attaching jig 9. Thus, the first bus bars 51 are assuredly guided near the corresponding anodes 23 and cathodes 24. At this time, the second bus bars 56 are arranged near the corresponding anodes 23 and cathodes 24 passing through the electrode through holes 32.

Further, since the space between the pair of contact pieces 52 of the first bus bar 51 is provided so as to be gradually larger than the space of the anode 23 and the cathode 24 as the contact pieces 52 are directed toward a direction facing the anode 23 and the cathode 24, the lower ends of the pair of contact pieces 52 do not collide with the ends of the anode 23 and the cathode 24 and the anode 23 and the cathode 24 are smoothly guided between the pair of contact pieces 52.

After that, the attaching jig 9 is detached from the cell assembly 2 and the plate 3 is allowed to come further nearer to the cell assembly 2 to overlap or overlay the plate 3 on the cell assembly 2 and the first bus burs 51 are allowed to come into complete contact with the corresponding anodes 23 and cathodes 24. At this time, the cell temperature detector 8 is pressed toward the upper surface 2a of the cell assembly 2 so that the cell temperature detector 8 constantly comes into contact with the upper surface 2a. Then, the second bus bars 56 are rotated in the bus bar accommodating parts 33 to allow the second bas bars to come into contact with the corresponding anodes 23 and cathodes 24. The first bus bars 51 and the second bus bars 56 are respectively welded to the anodes 23 and the cathodes 24.

Finally, the connectors 66 attached on the plate 3 are moved outward (rightward in FIG. 8) to insert the connecting piece 54 of the first bus bar 51 into the electric contact part of the terminal, fit the terminal to the connecting piece 54 and electrically connect the terminal to the connecting piece 54 (FIG. 9).

According to the present embodiment, since the positioning unit 71 and the guide unit 72 are provided, the cell assembly 2 and the plate 3 are positioned by the positioning unit 71 and the first bus bars 51 are guided to the positions where the first bus bars 51 respectively come into contact with the corresponding anodes 23 and the cathodes 24 by the guide unit 72. Accordingly, the plate 3 can be simply attached to the prescribed position of the cell assembly 2. Further, the first bus bars 51 can be assuredly attached to the anodes 23 and the cathodes 24 by an operation at one time and an assembly work can be simplified.

Further, since the first bosses 26 and the plurality of first holes 34 and the second bosses 27 and the second holes 45 are provided, when the first bosses 26 and the second bosses 27 are respectively inserted into the corresponding first holes 34 and second holes 45, the cell assembly 2 and the plate 3 are positioned. Accordingly, the plate 3 can be simply attached to the prescribed position of the cell assembly 2 and the assembly work can be simplified.

Further, since the guide unit 72 is the pair of contact pieces 52 having the space between them which is provided so as to be gradually larger than the space between the anode 23 and the cathode 24 as the contact pieces come nearer to the anode 23 and the cathode 24, the anode 23 and the cathode 24 can be assuredly located between the pair of contact pieces 52. Accordingly, the first bus bars 51 can be assuredly attached to the anodes 23 and the cathodes 24 by the operation at one time and the assembly work can be simplified.

Since the plate 3 includes the main body part 31, the one pair of outer side parts 41 and the connecting parts 36 that connect the main body part 31 to the one pair of outer side parts 41, the main body part 31 and the one pair of outer side parts 41 are respectively displaced relative to the cell assembly 2 and the first bus bars 51 and the second bus bars 56 assuredly come into contact with the respectively corresponding anodes 23 and cathodes 24. Accordingly, the first bus bars 51 and the second bus bars 56 can be assuredly attached to the anodes 23 and the cathodes 24.

Since the measuring section 6 is further provided that has the electric wire 61 arranged on the plate 3 and the terminal attached to the terminal part of the electric wire 61 and the first bus bar 51 is provided with the connecting piece 54 provided so as to be detachably attached to the terminal and electrically connected to the terminal. Thus, after the plate 3 is attached to the cell assembly 2, the terminal can be allowed to come into contact with the first bus bar 51. Before the cell assembly 2 is attached to the plate 3, the terminal does not need to come into contact with first bus bar 51. Accordingly, even when the first bus bar 51 is moved for positioning at the time of attaching the plate 3 to the cell assembly 2, a stress is not exerted on a connecting part of the terminal and the first bus bar 51. Thus, the damage of the terminal or the first bus bar 51 can be prevented.

Further, when the cell temperature detector 8 is attached to the plate 3 and the plate 3 is attached to the cell assembly 2, the elastic arms 82 of the cell temperature detector 8 generate the elastic restoring force so that the elastic arms press the detector main body 81 toward the upper surface 2a of the cell assembly 2. Thus, when the plate 3 is overlapped or overlaid on the cell assembly 2, the cell temperature detector 8 assuredly comes into contact with the upper surface 2a of the cell assembly 2. Accordingly, the cell temperature detector 8 can be simply and assuredly attached to the cell assembly 2.

Now, a power supply device 1 according to a second embodiment of the present invention will be described below by referring to FIG. 10 to FIG. 12. In a cell assembly 2 of the power supply device 1 according to the second embodiment is provided with a plurality of elastically deformed portions 28.

Figure 10:
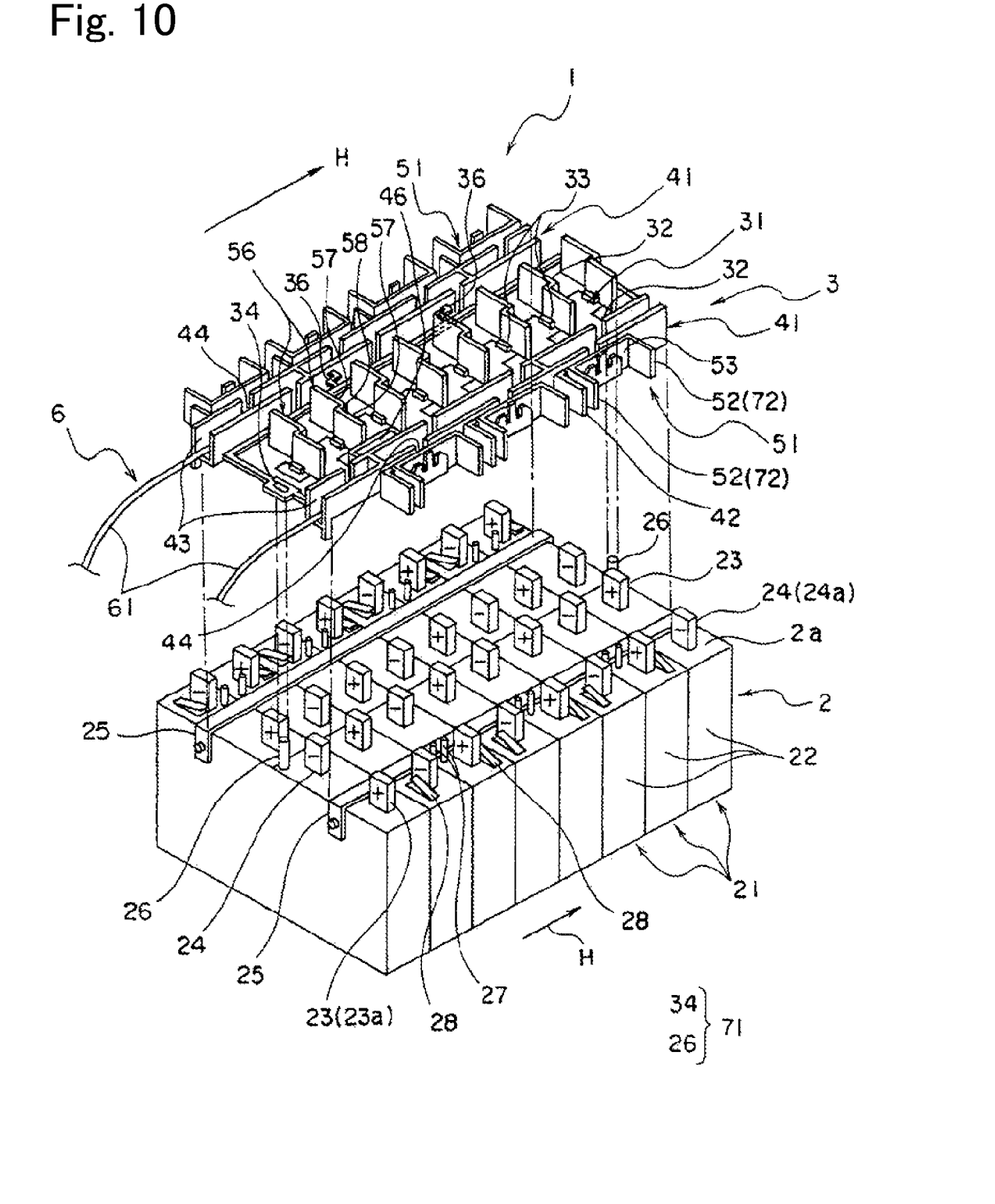
[FIG. 10] is a perspective view showing, in an exploded state, a power supply device according to a second embodiment of the present invention.

As shown in FIG. 10, the elastically deformed portions 28 are formed in the shapes of leaf springs. The elastically deformed portions 28 protrude on the upper surface 2a of the cell assembly 2 and are provided near anodes 23 and cathodes 24. The elastically deformed portions 28 are provided at positions on the upper surfaced 2a where first bus bars 51 are arranged. Then, when a plate 3 is overlapped or overlaid on the cell assembly 2, the elastically deformed portions 28 abut on the first bus bars 51 and are elastically deformed so as to come nearer to the upper surface 2a of the cell assembly 2 and urge the first bus bars 51 to be separated from the cell assembly 2 by an elastic restoring force.

Figure 11:
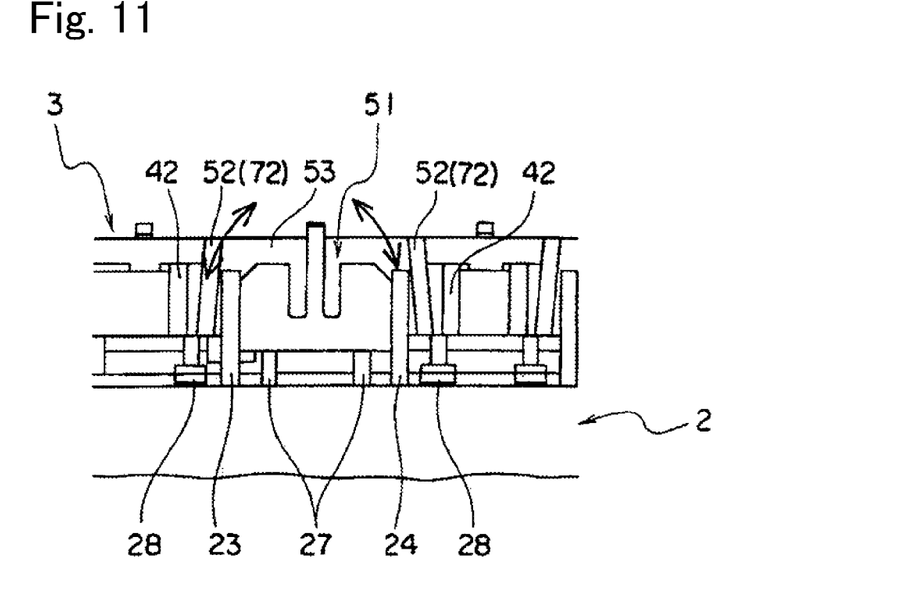
[FIG. 11] is a side view showing a state that a first bus bar comes near to a cell assembly shown in FIG. 10.
Figure 12:
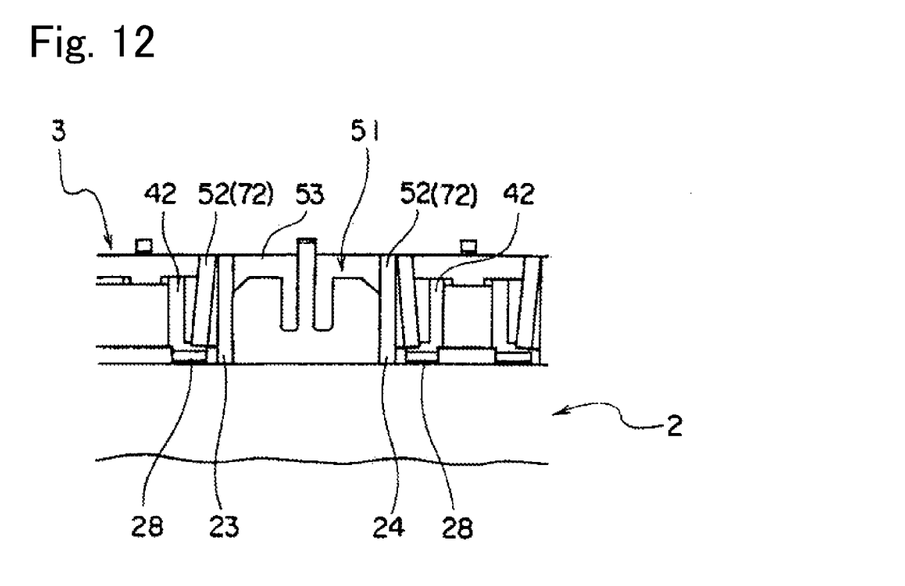
[FIG. 12] is a side view showing a state that the first bus bar is attached to the cell assembly shown in FIG. 11.

Since a space between pair of contact pieces 52 of the first bus bar 51 is provided so as to be gradually larger than a space between the anode 23 and the cathode 24 as the contact pieces are directed to face the anode 23 and the cathode 24, when the first bus bar 51 is attached to the corresponding anode 23 and cathode 24, the first bus bar 51 is occasionally inclined relative to a horizontal direction to be shaken (FIG. 11). However, even when the first bus bar 51 is inclined, for instance, one contact piece 52 comes nearer to the upper surface 2a of the cell assembly 2 in advance of the other contact piece, the one contact piece 52 abuts on the elastically deformed portion 28 and is pushed back. Thus, the first bus bar 51 is held in parallel to come nearer to the corresponding anode 23 and cathode 24 and attached to the anode 23 and the cathode 24 (FIG. 12).

According to the present embodiment, the elastically deformed portions are provided that are provided on the upper surface 2a of the cell assembly 2, abut on the first bus bars 51 and are elastically deformed to urge the first bus bars 51 to be separated from the cell assembly 2. Thus, when the first bus bars 51 are attached to the corresponding anodes 23 and cathodes 24, even if the first bus bars 51 are inclined, the elastically deformed portions 28 push back the first bus bars 51 to hold the first bus bars 51 in their horizontal positions. Accordingly, the first bus bars 51 are not attached to the anodes 23 and the cathodes 24 under a state that the first bus bars 51 are inclined and the first bus bars 51 can be allowed to assuredly come into contact with the anodes 23 and the cathodes 24.

As the above-described embodiments, representative embodiments of the present invention are merely described and the present invention is not limited to the embodiments.

Namely, various modifications may be made and embodied within a scope without departing from the gist of the present invention.

This application is based on Japanese Patent Application (Japanese Patent Application No. 2007-209076) filed on Aug. 10, 2007 and the contents of which are incorporated herein as a reference.

The invention claimed is:

1. A power supply device comprising:
a cell assembly which includes a plurality of cells, each of the cells having a positive electrode at one end and a negative electrode at the other end;
a plurality of connecting members, each of which connects the positive electrode of one cell and the negative electrode of a neighboring cell in the cell assembly, the one cell and the neighboring cell being mutually adjacent;
a plate to which the plurality of connecting members are attached and which is overlapped on the cell assembly;
a positioning unit that relatively positions the cell assembly to the plate; and
a guide unit that guides the plurality of connecting members to positions where the connecting members respectively come into contact with the corresponding positive electrodes and negative electrodes when the plate is attached to the cell assembly,
wherein each of the connecting member includes:
a pair of contact pieces that position the positive electrode and the negative electrode therebetween; and
a connecting piece that connects one end part of the pair of contact pieces to each other; and
wherein the guide unit is the pair of contact pieces having a space therebetween which is provided so as to be gradually larger than a space between the positive electrode and the negative electrode as the guide unit comes nearer to the positive electrode and the negative electrode.

2. The power supply device according to claim 1, wherein the positioning unit includes:
a plurality of protruding portions protruding from one face of the cell assembly; and
a plurality of holes provided into the plate into which the plurality of protruding portions are inserted.

3. The power supply device according to claim 1, wherein the plate includes:
a main body part arranged at a center of the cell assembly;
a pair of outer side parts provided in parallel with the main body part, the main body part being arranged between them; and
a connecting part provided so as to be elastically deformed and connects the main body part to the pair of outer side parts.

4. The power supply device according to claim 1, further comprising:
elastically deformed portions provided on an outer face of the cell assembly, abut on the connecting members and are elastically deformed to urge the connecting members to be separated from the cell assembly when the plate is overlapped on the cell assembly.

5. The power supply device according to claim 1, further comprising:
a measuring section which includes an electric wire arranged on the plate and a terminal attached to a terminal part of the electric wire to measure a potential difference of the electrodes of the two adjacent cells of the cell assembly,
wherein the connecting member has a connecting piece provided so as to be detachably attached to the terminal and electrically connected to the terminal when the connecting piece comes into contact with the terminal.

6. The power supply device according to claim 1, wherein a cell temperature detector is attached to the plate;
wherein the cell temperature detector includes:
a detector main body; and
an elastic arm having one end part connected to the detector main body and the other end part engaged with the plate; and
wherein, when the plate is attached to the cell assembly, the elastic arm generates an elastic restoring force so that the elastic arm presses the detector main body toward an outer face of the cell assembly.

* * * * *